United States Patent

Bhattacharyya

[11] Patent Number: 5,100,582
[45] Date of Patent: Mar. 31, 1992

[54] WATER SOLUBLE POLYMER AS WATER-IN-OIL DEMULSIFIER

[75] Inventor: Bhupati R. Bhattacharyya, Downers Grove, Ill.

[73] Assignee: Nalco Chemical Company, Naperville, Ill.

[21] Appl. No.: 458,437

[22] Filed: Dec. 28, 1989

[51] Int. Cl.$^5$ .................. B01D 17/04; C10G 33/04
[52] U.S. Cl. .................. 252/340; 252/342; 252/358; 526/329.5
[58] Field of Search .......... 252/340, 342, 358; 526/319, 329.5, 329.7; 208/188; 210/708

[56] References Cited

U.S. PATENT DOCUMENTS

| | | | |
|---|---|---|---|
| 3,310,513 | 3/1967 | Barie, Jr. et al. | 526/329.5 X |
| 3,340,193 | 9/1967 | Fields et al. | 252/358 X |
| 4,230,599 | 10/1980 | Elfers | 252/358 X |
| 4,582,628 | 4/1986 | Buriks et al. | 252/340 |
| 4,968,449 | 11/1990 | Stephenson | 252/342 X |

FOREIGN PATENT DOCUMENTS

| | | | |
|---|---|---|---|
| 61-057211 | 3/1986 | Japan | 252/358 |
| 61-183307 | 8/1986 | Japan | 526/329.5 |

Primary Examiner—Richard D. Lovering
Assistant Examiner—Daniel S. Metzmaier
Attorney, Agent, or Firm—Kinzer, Plyer, Dorn, McEachran & Jambor

[57] ABSTRACT

An emulsion polymer having activity as a demulsifier for a w/o emulsion, particularly water-in-crude oil, having the general formula

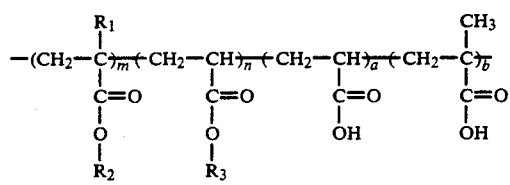

4 Claims, 1 Drawing Sheet

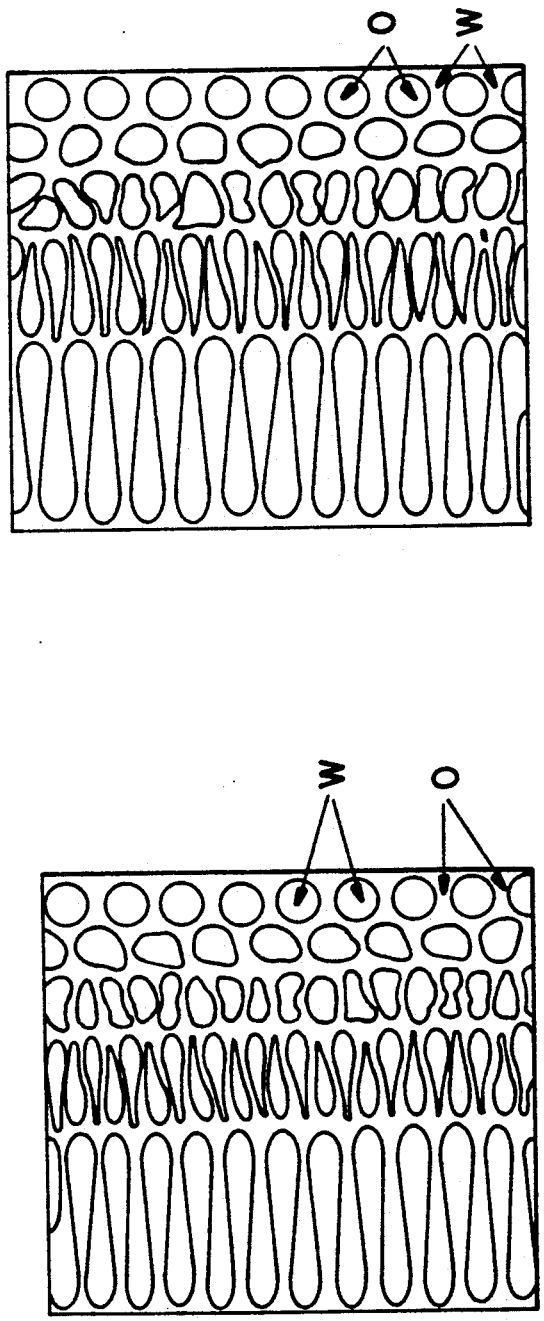

WATER SOLUBLE POLYMER AS WATER-IN-OIL DEMULSIFIER

BACKGROUND OF THE INVENTION

This invention relates to the demulsification of crude oil to separate water from the oil. More specifically, the invention is an emulsion polymer soluble in the dispersed water naturally present in a crude oil flowing from the well head.

Chemical demulsification has since long established itself as the cheapest, most convenient and effective method in breaking a water in crude oil (w/o) emulsion. Demulsification has gained in importance because the use of steam and caustic injection or combustion processes, for in-situ recovery of heavy oils, is complicated by the production of viscous emulsions of oil, water and clay. Crude oil is found in the reservoir in association with gas and saline formation water. As the reservoir becomes depleted a time will be reached when water is coproduced with oil. The number of wells now coproducing water with crude oil is steadily increasing; these immiscible fluids are readily emulsified by the simultaneous action of shear and pressure drop at the well head, chokes and valves.

It has long been recognized that the resulting w/o emulsion can be remarkably stable. Further, it is now understood that indigenous crude oil surfactants adsorb at the oil-water interface giving rise to a physically strong film, an interfacial skin around the dispersed water droplet, which in turn promotes these stable emulsions. The coproduction of the water with crude oil may give rise to a variety of problems. These include the expense of pumping or transporting water via pipeline or tanker; the corrosion of pipework, pumps, production equipment and downstream overhead distillation columns and the poisoning of downwstream refinery catalysts. Consequently, those factors which either enhance or reduce crude oil emulsion stability are of considerable importrance to the oil industry.

Oil soluble demulsifiers are commonly used to destabilize the w/o emulsions. These emulsions are moderate (2,000-50,000) molecular weight, polydispersed interfacially active polymers. They are mostly non-ionic block polymers with hydrophilic and hydrophobic segments. The method of production of oil soluble demulsifiers in most cases involves handling of dangerous and expensive chemicals like ethylene and propylene oxide. It would be highly desirable to have demulsifiers that are water soluble but as effective as their oil soluble counterpart. The primary object of this invention is to achieve such a water soluble demulsifier.

SUMMARY OF THE INVENTION

The water soluble demulsifier of the present invention is preferably an emulsion tetrapolymer of methyl methacrylate, butyl acrylate, acrylic acid and methacrylic acid, but styrene may be tacked on to the methyl methacrylate to result in a penta polymer. The polymer is of random orientation, not block, and preferably has a molecular weight in the range of 11 to 15 thousand.

As produced in the laboratory and as used in the field, the polymer is a thin (low viscosity) chalk white fluid, soluble in water at pH 6/7. When added to the crude pumped from the well, it seeks out and collects the dispersed water droplets, breaking the w/o emulsion.

BRIEF DESCRIPTION OF THE DRAWING

FIG. 1 is a diagram of an oil-in-water emulsion; and
FIG. 2 is a diagram of a water-in-oil emulsion.

PREFERRED EMBODIMENTS OF THE INVENTION

Discussion

To visibly observe demulsification processes in crude oil (water-in-oil), a crude oil was replicated by a 7:3 (volumetic) combination of heptane and toluene. This combination of heptane and toluene is termed herein the "crude oil replicate" base, a solution. To verify that asphaltenes are the natural emulsifier (surfactant) in an indigenous crude oil containing dispersed water, asphaltenes were separated from a natural East Texas Crude and two grams were added to a liter of the crude oil replicate base; the resultant solution was then mixed with water in a 7:3 (volumetric) ratio resulting in a very stable w/o (water-in-oil) emulsion as was expected.

Two experiments were then conducted, Case-A and Case-B. For Case-A, seven parts of asphaltenes dissolved in the crude oil replicate base were mixed with three parts of distilled deionized water in a stoppered vessel. For Case-B, three parts of a one gram/lit aqueous solution of sodium dodecyl sulfate (SDS) were combined with seven parts of the crude oil replicate base, but without asphaltenes, in a second stoppered vessel. The stoppered vessels were shaken vigorously.

Case-A is illustrated in FIG. 1. Here, where the asphaltenes were present, phase separation was from the top of the vessel. The oil-water interface moved downward. Large pockets of water were observed in the lower section of the vessel, the water being encapsulated by a film of oil as the continuous phase.

In FIG. 2, Case-B is illustrated, where the surfactant (SDS) was in the water phase, the continuous phase. Phase separation was from the bottom upward and the water film encapsulated bodies of the oil phase.

Under the present invention, highly efficient polymeric demulsifiers for breaking water-in-oil emulsions, separating the two phases so oil may be recovered, are achieved by emulsion polymerization synthesis. The emulsion containing the polymer is thin, but the active polymer content is highly concentrated. These polymers are of random stucture, presenting varying percentages of hydrophilic (—COOH) and hydrophobic (alkyl) groups and varying molecular weights synthesized from varying percentages of acrylic acid, methacrylic acid, ethyl hexyl acrylate, monomethyl acrylate and butyl acrylate as their effective constituents. By varying the percentage of these groups it is possible to control very closely the molecular weight, hydrophilicity and hydrophobicity of the active polymer.

The polymers of this invention comply with the following structure:

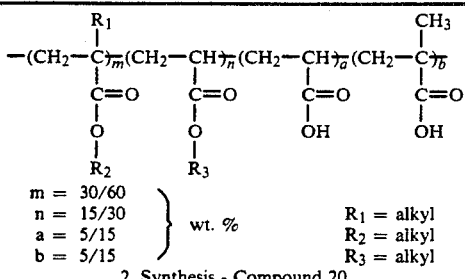

m = 30/60  
n = 15/30  
a = 5/15  
b = 5/15 wt. %

$R_1$ = alkyl  
$R_2$ = alkyl  
$R_3$ = alkyl

2. Synthesis - Compound 20

| Item | Ingredient | Wt. % | Grams |
|---|---|---|---|
| 1. | DI Water | 46.58 | 232.90 |
| 2. | Siponate DS-4 (1) | 0.048 | 0.24 |
| 3. | Ammonium persulfate | 0.237 | 1.20 |
| 4. | DI Water | 1.195 | 5.98 |
| 5. | Methyl methacrylate | 26.28 | 131.40 |
| 6. | Butyl acrylate | 14.33 | 71.67 |
| 7. | Methacrylic acid | 4.78 | 23.90 |
| 8. | Acrylic acid | 2.39 | 11.95 |
| 9. | n-BMP (2) | 1.43 | 7.15 |
| 10. | DI Water | 0.19 | 0.95 |
| 11. | tert. Butyl hydroperoxide | 0.096 | 0.48 |
| 12. | DI Water | 2.394 | 11.97 |
| 13. | Erythorbic acid | 0.024 | 0.12 |
| 14. | Sodium metabisulfite | 0.024 | 0.12 |

(1) sodium dodecyl benzene sulfonate (emulsifier)
(2) n-butyl mercaptopropionate Procedure - Compound 20

Ingredients 1 and 2 were added to the reaction vessel and heated to 84° C. At this temperature, items 3 and 4 (mixture) were added to the reaction vessel. After about 2 min., the monomer mixture (ingredients 5,6,7,8) along with the n-BMP were pumped into the reaction vessel over a period of 135 mins. After this, a temperature of 83°/85° C. was maintained in the reaction vessel for 30 mins. and then the contents were allowed to cool to 60° C. After cooling the reactants in the reaction vessel, a mixture of ingredients 10 and 11 was added, followed by a mixture of ingredients 12, 13 and 14, while maintaining the temperature of 60° C. for 1 hr., completing formation of the latex which was filtered as the product, that is, the product was the emulsion polymer identified as compound 20 in Table 1 which now follows:

as that given for Compound 20. It too broke the crude oil emulsion in about 10 minutes.

At this point it may be mentioned that the following alkyl groups featured in the acrylates employed in the examples:

| MMAc | $R_1$ is —$CH_3$ (but could be —H)<br>$R_2$ is —$CH_3$ |
|---|---|
| BuAc | $R_3$ is —$C_4H_9$ |
| 2-EHAc | $R_3$ is —$CH_2$—$CH$—$(CH_2)_3$—$CH_3$<br>                     \|<br>                   $C_2H_5$ | where $C_2H_5$ may also be methyl or up to octyl.

Some inefficient polymers were observed, inefficient from the standpoint of time (too long) to break the emulsion, or inefficient from the standpoint of not completely breaking the emulsion. Examples are polymers containing no MMAc and no MAA, e.g. 90 BuAc, 10 AA.

Experimentation establishes lower molecular weights are the preference, and I postulate an upper limit of about 15,000, a lower limit of about 10,000. An overabundance of alkyl function should be avoided.

The polymer is easily synthesized as an emulsion polymer in whch the active polymer is nearly 50 percent by weight, which is a highly efficient concentration. In the field, the emulsion polymer is pumped into the crude oil while the crude in turn is being pumped to the storage or holding tank where the crude emulsion separates into oil floating on water. The preferred dosage is 10 to 15 ppm.

While I have disclosed the preferred emulsion polymers for demulsifyng a water-in-crude oil emulsion pumped from the well head, it will be understood other similar oil-in-water emulsions could be treated. Further, while I have disclosed and claimed the preferred embodiments from the standpoint of those most effective in values of weight percent monomer, and molecular weight for high percent performance in a limited time, it will be understood that these values can be varied for equivalent performance, or near equivalent perfor-

TABLE 1

| Compound No. | Wt % MMAc | Wt % BuAc | Wt % 2-EHAc | Wt % AA | Wt % MAA | Wt % nBMP | Mw × $10^3$ | Mn × $10^3$ | Mw/Mn (PD) | % ED TEXAS |
|---|---|---|---|---|---|---|---|---|---|---|
| 20 | 55.0 | 30.0 | — | 5.0 | 10.0 | 1.43 | 12.2 | 5.50 | 2.2 | 100 |
| 22 | 63.0 | — | 22.0 | 5.0 | 10.0 | 1.43 | 11.3 | 5.25 | 2.2 | 100 |

MMAc = Methyl methacrylate  
BuAc = Butyl acrylate  
2-EHAc = 2-ethyl hexyl acrylate  
AA = Acrylic acid  
MAA = Methacrylic acid  
nBMP = n-butyl mercaptopropionate  
Mw = molecular weight (average)  
Mn = molecular weight (number average)  
Mw/Mn = molecular weight distribution  
% ED = percent efficiency as demulsifier for Texas crude oil Compound 20, it can be seen from Table 1, is a tetrapolymer, poly methylmethacrylate/butyl acrylate/acrylic acid/methacrylic acid. It, and Compound No. 22 as well, is a thin (low viscosity) chalk-white liquid, approximating water in viscosity.

Compound 20 completely demulsified an East Texas crude oil after about 10 minutes.

Referring again to Table 1, Compound 22 also was a tetrapolymer, substituting ethyl-hexyl acrylate for butyl acrylate. With this difference, the procedure is the same mance where tolerable. There are indications, for example, that some styrene can be added to the tetrapolymer or used as a substitute for 2-HEMA.

The values for m, n, a and b set forth above are weight percent (wt. %) ranges, that is, m = 30 to 60 weight percent  
n = 15 to 30 weight percent  
a = 5 to 15 weight percent  
b = 5 to 15 weight percent.

I claim:

1. A water soluble emulsion polymer of random orientation having the structure

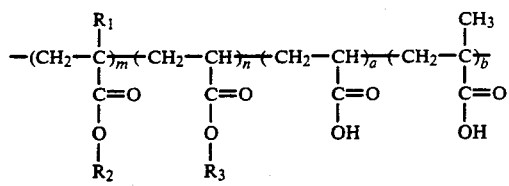

and wherein $R_1$ is —$CH_3$, $R_2$ is —$CH_3$, $R_3$ is butyl, and wherein $m = 30$ to $60$ wt. %
$n = 15$ to $30$ wt. %
$a = 5$ to $15$ wt. %, and
$b = 5$ to $15$ wt. %.

2. An emulsion polymer according to claim 1 having a molecular weight of about 10,000 to 15,000.

3. A method of demulsifying a water-in-oil emulsion comprising the treatment of adding to the emulsion a demulsifying effective to demulsify amount of the emulsion polymer of claim 2.

4. A method according to claim 3 in which the emulsion being treated is a naturally occurring water-in-crude oil pumped from a well head.

* * * * *

UNITED STATES PATENT AND TRADEMARK OFFICE
CERTIFICATE OF CORRECTION

PATENT NO. : 5,100,582
DATED : March 31, 1992
INVENTOR(S) : Bhupati R. Bhattacharyya It is certified that error appears in the above—identified patent and that said Letters Patent is hereby corrected as shown below:

In the Abstract: After the formula, insert the following:

--and wherein

| | | | | | |
|---|---|---|---|---|---|
| m | = | 30/60 ) | | $R_1$ = | alkyl or H |
| n | = | 15/30 ) | wt.% | $R_2$ = | alkyl |
| a | = | 5/15 ) | | $R_3$ = | alkyl |
| b | = | 5/15 )-- | | | |

Column 6, line 9, cancel "to demulsify".

Signed and Sealed this

Seventeenth Day of August, 1993

Attest:

BRUCE LEHMAN

Attesting Officer    Commissioner of Patents and Trademarks